July 2, 1935.　　　　G. O. WILMS　　　　2,006,974

RHEOSTATIC CONTROLLER

Filed July 21, 1923　　　2 Sheets-Sheet 1

INVENTOR.
Gustav O. Wilms
BY
Edwin B. H. Towx, Jr.
ATTORNEY.

July 2, 1935.  G. O. WILMS  2,006,974
RHEOSTATIC CONTROLLER
Filed July 21, 1923  2 Sheets-Sheet 2

INVENTOR.
Gustav O. Wilms
BY
Edwin B. H. Tower, Jr.
ATTORNEY.

Patented July 2, 1935

2,006,974

UNITED STATES PATENT OFFICE 2,006,974

RHEOSTATIC CONTROLLER

Gustav O. Wilms, Milwaukee, Wis., assignor, by mesne assignments, to Allen-Bradley Company, Milwaukee, Wis., a corporation of Wisconsin Application July 21, 1923, Serial No. 652,965

13 Claims. (Cl. 201—51)

The invention relates to a rheostatic motor controller.

The particular rheostatic motor controller to which the invention applies employs a carbon disk or other compressible resistor having the pressure thereon controlled by a pivoted lever actuator.

Such a controller, as it existed prior to the invention set forth herein, was incapable of giving a gradual and controllable variation in resistance above a low and narrow range, as its gradual and controllable variation in resistance depended upon its resistor being compressible and having a high pressure varied thereon.

Accordingly, it was not suitable or sufficient to be employed to control fractional horsepower electric motors or for other purposes which require a gradual and controllable variation in resistance through a high and wide range.

The invention has as its object to provide a carbon disk controller in which a gradual and controllable variation in resistance may be obtained through a high and wide range.

Another object is to provide a carbon disk controller in which a small resistor will give a gradual and controllable variation in resistance through a high and wide range.

Another object is to provide a small and compact motor controller for fractional horsepower motors and other purposes which require a gradual and controllable variation in resistance through a high and wide range.

Another object is to provide a motor controller having a treadle or lever so arranged that the overall dimensions of the controller are reduced to a minimum.

The present invention provides a rheostatic motor controller in which a pivoted lever actuator having a spring to enable its lever to be given a gradual movement and retained in any intermediate position is employed to vary the pressure upon the resistor and allow the lever to have a wide and substantial movement in varying the low pressure and thereby obtain a gradual and controllable variation in a high resistance through a wide range above the normal gradual and controllable variation in a low resistance obtainable by variations in a high pressure upon the resistor.

The invention which is herein set forth provides a rheostatic motor controller by which a fractional horsepower electric motor may be controlled to obtain a wide and gradual variation in its speed from a low speed to a high speed, but such controller may be employed for various other purposes.

The basic or fundamental aspect of the invention is set forth and claimed in Patent No. 1,777,988, issued October 7, 1930 upon an application which was a continuation of the present application as to matter common to both applications.

According to the invention, in its general aspect, the controller has two compressible resistors arranged parallel to each other within a casing, a pivoted lever actuator having an actuating rod arranged between the resistors and provided with a cross-bar to engage the ends thereof and connect the same in circuit, and a low tension spring to be deflected by the actuator and urge the cross-bar against the ends of the resistors to apply and vary a low pressure thereon and allow the actuator to have a wide and substantial movement in varying the low pressure and thereby obtain a gradual and controllable variation in a high resistance through a wide range above the normal gradual and controllable variation in a low resistance obtainable by variations in a high pressure upon the resistors.

According to another aspect of the invention, the resistor spring is opposed upon the other side of the cross-bar by another spring which normally holds the cross-bar out of engagement with the resistors, and the pressure applied upon the resistors through the cross-bar is equal to the resultant of the effective reactions of the two springs when the same are deflected by the actuator.

According to another aspect of the invention, the power arm of the actuator lever overlies the resistors and its load arm is arranged at the ends of the resistors opposite the cross-bar, thereby providing a compact and easily operable controller.

The present application is a continuation of copending applications Serial No. 458,525, filed April 4, 1921, and Serial No. 574,803, filed July 13, 1922, Patent No. 1,631,111, May 31, 1927, as to any matters set forth or claimed herein and disclosed in said applications.

The invention is exemplified in the accompanying drawings in which the views are as follows.

Figure 1:
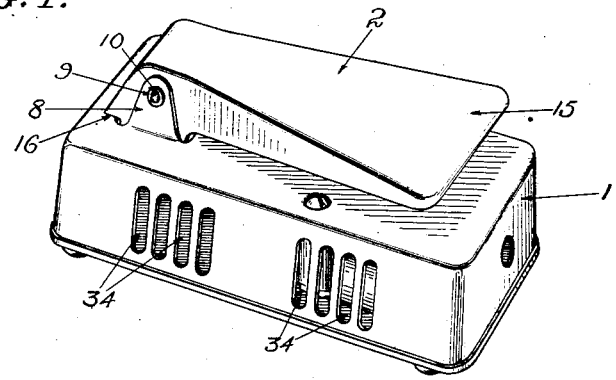
Fig. 1 is a perspective view of a rheostatic controller in which the invention is embodied.
Figure 2:
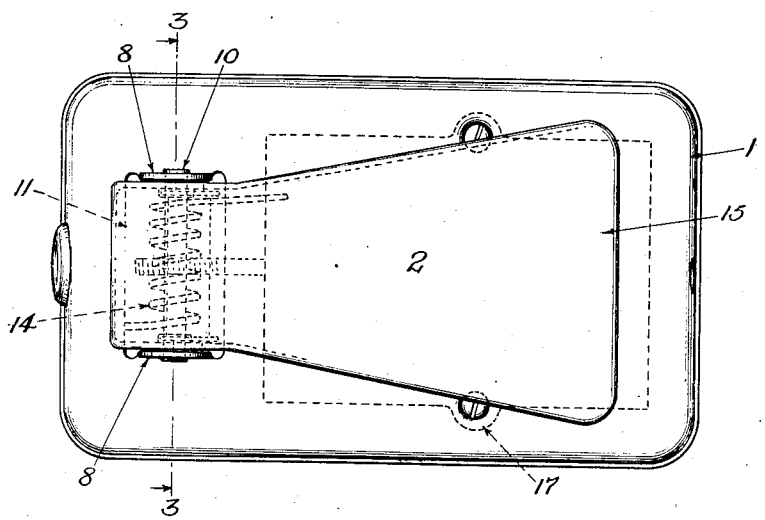
Fig. 2 is a top plan view thereof.
Figure 3:
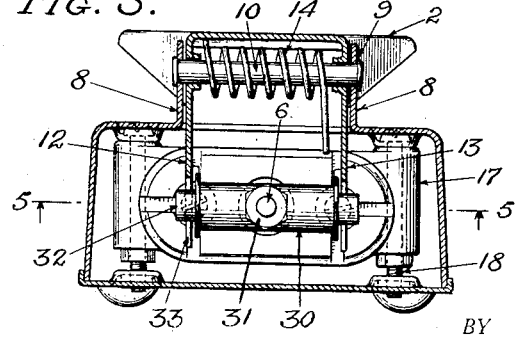
Fig. 3 is a transverse section on the line 3—3 of Fig. 2.
Figure 4:
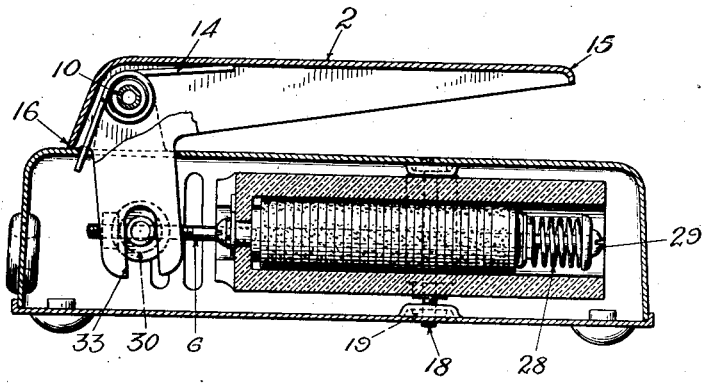
Fig. 4 is a section on the line 4—4 of Fig. 5.
Figure 5:
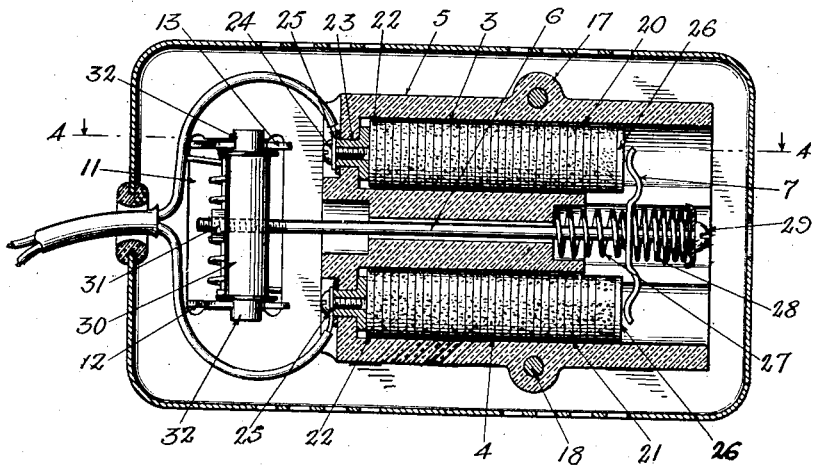
Fig. 5 is a section on the line 5—5 of Fig. 3.

The rheostat comprises, in general, a casing 1 having a treadle 2 pivoted thereon and two compressible resistors 3 and 4 arranged therein parallel to each other.

The resistors 3 and 4 are arranged within an insulating frame 5 and are ordinarily carbon disk resistors the resistance of which varies with the pressure applied thereto.

The resistors 3 and 4 each comprise a stack of disks, the surfaces of which are of high microphonic value and when viewed under a microscope show myriads of small projections and depressions or minute serrations which interengage to varying degrees with those of the adjacent surface of the next disk as pressure is applied to the pile.

The pressure applied to the treadle, by the foot of the operator, is transmitted to the resistors through an actuating rod 6 and a cross-bar 7.

The casing 1 comprises a substantially rectangular metallic box having an integral top and sides and a covered bottom.

The casing 1 has struck up from its upper surface a pair of lugs 8 apertured at 9 for the reception of a pivot pin 10 on which the treadle 2 is mounted.

A rectangular opening 11 is formed in the top of the casing between the spaced lugs 8 through which the downwardly extending ends 12 and 13 of the treadle project.

A coiled actuator spring 14 surrounding the pin 10 normally biases the outer end 15 of the treadle upwardly.

This spring has a sufficiently high tension to enable the operator to move the actuator lever gradually and readily hold it in any intermediate position.

The treadle has a tail-piece or stop member 16 formed on the rear end thereof for engagement with the top of the casing 1 to limit the upward movement of the treadle.

The frame 5 is made of porcelain or other suitable insulating material and has on each side thereof apertured lugs or eyelets 17, through which the bolts 18 pass to retain the frame within the casing. These bolts pass through the top and bottom of the casing and hold the bottom in place by means of nuts 19.

The resistors 3 and 4 are located in spaced pockets 20 and 21 in the insulating frame 5.

The inner disc 22 of each resistor is in contact with the head of a hollow internally threaded rivet 23 having a screw 24 therein by which the terminals 25 are fastened thereto.

The actuator for compressing the resistors comprises the treadle 2, actuating rod or member 6 and cross-bar 7.

The actuator rod 6 extends freely through the frame 5 between the resistors and parallel thereto, and the cross-bar 7 is arranged upon the rod 6 at the front ends of the resistors.

The cross-bar is normally held out of contact with the end electrode 26 of each resistor by a coiled return spring 27, to open the circuit and relieve the resistors of any pressure.

The cross-bar 7 and actuating rod 6 are adapted to be moved inwardly against the spring 27 to permit the outer ends of the cross-bar to engage the outer end electrodes 26 to connect the resistors in series.

The movement of the actuating rod is transmitted to the cross-bar 7 by a coiled resistor spring 28 surrounding the rod between the head 29 thereof and the cross-bar 7.

The actuator rod 6 has its other end threaded through a cross-pin 30, and it may be adjusted to vary the initial tension of the springs 27 and 28 and then secured in adjusted position by a locknut 31.

The cross-pin 30 is reduced in diameter at its ends to provide trunnions 32 which are arranged in slots 33 formed in the vertical arm of the actuating lever 15.

Pressure applied upon the front end 15 of the actuator lever 2 causes the rod 6 to be drawn rearwardly against the action of the springs 27 and 28, and the frame 5 holds the rod 6 against lateral or vertical movement and causes the trunnions 32 to move vertically in the slots 33.

Forward movement of the actuator rod 6 compresses the resistor spring 28 which urges the cross-bar 7 into engagement with the resistors and connects them in circuit and thereafter applies and varies a low pressure thereon to gradually and uniformly vary the resistance thereof through a high range.

The resistor spring 28 has a low tension and enables the actuator lever 2 to have a wide or substantial movement in applying a low pressure upon the resistors.

If the controller is not provided with a return spring 27 for removing the resistors from circuit and a resistor spring 28 is provided which is capable of varying a pressure upon the resistors of the order of .03 to .25 lbs., a gradual and controllable variation in resistance of the order of 400 ohms to 100 ohms may be obtained.

However, the controller is provided in actual practice with a return spring for removing the resistors from circuit and the two springs are calibrated to obtain the result set forth above.

That is, the resistor spring urges the cross-bar against the resistors and the movement of the cross-bar is resisted by the return spring so that the pressure actually applied to the resistors is equal to the difference between the reactions of the two springs, the initial tensions of these springs being regulated by adjusting the rod 6 relatively to the cross-pin 30 and then securing it in adjusted position by tightening the lock nut 31.

The tension of the resistor spring is so low that it is capable of varying the resistance of the resistors through a high range only.

After the resistor spring is exhausted, the resistance of the resistors may be further reduced by pressure applied substantially direct to the cross-bar which may be resilient in order to gradually vary the resistance through a lower range.

The invention herein set forth is susceptible of various modifications and adaptations without departing from the scope thereof as hereafter claimed.

The invention is hereby claimed as follows:—

1. A carbon disk controller, comprising two carbon disk resistors arranged parallel to each other, a cross-bar arranged to engage said resistors and connect the same in circuit, a resistor spring engaging said cross-bar upon one side thereof, a pivoted lever actuator arranged to apply pressure to said resistors through said spring and said cross-bar, a second spring engaging said cross-bar upon the other side thereof to urge the same out of engagement with said resistors and remove said resistors from circuit, and an actuator spring arranged to control said actuator and having sufficient tension to enable the actuator lever to be given a gradual movement and retained in any intermediate position.

2. A carbon disk controller, comprising two carbon disk resistors arranged parallel to each other, a cross-bar to engage said resistors at the forward ends thereof and connect the same in series, a resistor spring engaging said cross-bar, a lever actuator pivoted at the rear ends of said resistors, a rod arranged between said resistors and connecting said actuator to said resistor spring to apply equal pressures to said resistors through said resistor spring and said cross-bar, another spring opposing said resistor spring and tending to separate said resistors and said cross-bar to remove said resistors from circuit, and an actuator spring to control said actuator and having sufficient tension to enable the actuator lever to be given a gradual movement and retained in any intermediate position.

3. A carbon disk controller, comprising in combination, two carbon disk resistors, a contact bar arranged at one end of said resistors to connect the same in series and apply pressure thereto, an actuator to apply pressure to said bar, a resistor spring arranged to transmit pressure from said actuator to said bar and proportioned to produce a gradual variation in resistance in said resistors under a low pressure, and another spring engaging said bar in opposition to said resistor spring to remove said bar from contact with said resistors.

4. A carbon disk controller, comprising two carbon disk resistors arranged parallel to each other, a cross-bar arranged to connect said resistors in series and apply pressure thereon, a low tension resistor spring engaging said cross-bar upon one side thereof to control the pressure applied upon said resistors by said cross-bar and having its capacity proportioned to produce a gradual variation in resistance in said resistors under a low pressure, a pivoted lever actuator to operate said resistor spring, a second spring engaging said cross-bar upon the other side thereof to urge the same out of engagement with said resistors and remove said resistors from circuit, and an actuator spring arranged to control said actuator and having sufficient tension to enable the actuator lever to be given a gradual movement and retained in any intermediate position.

5. A carbon disk controller, comprising two carbon disk resistors arranged parallel to each other, a cross-bar arranged to connect the said resistors in series at the forward ends thereof and apply pressure thereon, a low tension resistor spring engaging said cross-bar upon one side thereof to control the pressure applied upon said resistors by said cross-bar and having its capacity proportioned to produce a gradual variation of resistance in said resistors under a low pressure, a lever actuator pivoted at the rear ends of said resistors, a rod arranged between said resistors and connecting said actuator to said resistor spring to operate the same, another spring engaging said cross-bar upon the other side thereof and tending to separate said resistors and said cross-bar to remove the said resistors from circuit, and an actuator spring to control said actuator and having sufficient tension to enable the actuator lever to be given a gradual movement and retained in any intermediate position.

6. A rheostatic controller, comprising in combination, two carbon disk resistors arranged parallel to each other, a bridge bar arranged to apply pressure to said resistors, an actuator having a pivoted operating lever and a spring to enable said lever to be given a gradual movement and retained in any intermediate position, a rod arranged between said resistors and connected to said actuator at the end of said resistors opposite to said bridge bar, and a low-tension helical spring connected to said rod to apply pressure to said bridge bar and thereby vary a pressure upon said resistors and proportioned to allow said lever to have a wide or substantial movement in varying said pressure and thereby enable a gradual variation in resistance to be obtained throughout a wide range above the normal gradual variation in a low resistance obtainable by variation in a high pressure upon said resistors.

7. A rheostatic controller, comprising in combination, two carbon disk resistors arranged parallel to each other, a bridge bar arranged to apply pressure to said resistors, an actuator having a pivoted operating lever and a spring to enable said lever to be given a gradual movement and retained in any intermediate position, a low tension helical spring actuated by said actuator to apply pressure to said bridge bar and thereby vary a pressure upon said resistors and proportioned to allow said lever to have a wide or substantial movement in varying said pressure and thereby enable a gradual variation in resistance to be obtained throughout a wide range above the normal gradual variation in a low resistance obtainable by variation in a high pressure upon said resistors, and another spring arranged to act in opposition to said low tension helical spring to lessen the pressure applied thereby to said resistors to the resultant difference in pressure between said springs.

8. A rheostatic controller, comprising in combination, two carbon disk resistors arranged parallel to each other, a bridge bar arranged to apply pressure to said resistors, an actuator having a pivoted operating lever and a spring to enable said lever to be given a gradual movement and retained in any intermediate position, a rod arranged between said resistors and connected to said actuator at the end of said resistors opposite to said bridge bar, a low-tension helical spring connected to said rod to apply pressure to said bridge bar and thereby vary a pressure upon said resistors and proportioned to allow said lever to have a wide or substantial movement in varying said pressure and thereby enable a gradual variation in resistance to be obtained throughout a wide range above the normal gradual variation in a low resistance obtainable by variation in a high pressure upon said resistors, and another spring arranged to act in opposition to said low-tension helical spring to lessen the pressure applied thereby to said resistors to the resultant difference in pressure between said springs.

9. A rheostatic controller, comprising a supporting frame, two horizontal carbon disk resistors arranged parallel to each other upon said supporting frame, a bridge arranged to apply pressure to said resistors, a pivoted treadle arranged over and above said resistors and having a spring opposing its movement from its initial position, and a depending arm arranged upon said treadle at its pivot end and connected to said bridge.

10. A rheostatic controller, comprising a supporting frame, two horizontal carbon disk resistors arranged parallel to each other upon said supporting frame, a bridge arranged to apply pressure to said resistors, a rod connected to said bridge and arranged between said resistors, a pivoted treadle arranged over and above said resistors and having a spring opposing its movement from its initial position, and a depending arm arranged upon said treadle at its pivot end and connected to said rod.

11. A rheostatic controller, comprising a supporting frame, two horizontal carbon disk resistors arranged parallel to each other upon said supporting frame, a bridge arranged to apply pressure to said resistors, a pivoted treadle arranged over and above said resistors and having a spring opposing its movement from its initial position, a depending arm arranged upon said treadle at its pivot end and connected to said bridge, and a removable casing enclosing said resistors and having said treadle pivoted thereon.

12. A rheostatic controller, comprising a supporting frame, two horizontal carbon disk resistors arranged parallel to each other upon said supporting frame, an inner casing enclosing said resistors and carried by said supporting frame, a bridge arranged to apply pressure to said resistors, a pivoted treadle arranged over and above said resistors and having a spring opposing its movement from its initial position, a depending arm arranged upon said treadle at its pivot end and connected to said bridge, and a removable outer casing enclosing said inner casing and having said treadle pivoted thereon.

13. A rheostatic controller comprising in combination a plurality of carbon disk resistors composed of a stack of individual carbon disks whose engaging surfaces consist of myriads of small projections and depressions so that through increasing and decreasing interengagement of the surface projections and depressions of adjacent disks effected through slight variations in pressure on the stack a gradual variation in the sum total of the microphonic resistance of the individual disks throughout a wide range may be obtained, means to apply varying pressure on the stack comprising a member arranged to apply pressure to said resistors, an actuator having a pivoted operating lever and a spring to enable said lever to be given a gradual movement and retained in any intermediate position, a member arranged between said resistors and connected with said actuator at the end of said resistors opposite to said first member, and a low-tension helical spring connected with said second member to apply pressure to said first member and thereby vary a pressure upon said resistors and proportioned to allow said lever to have a wide or substantial movement in varying said pressure and thereby enable a gradual variation in resistance to be obtained throughout a wide range above the normal gradual variation in a low resistance obtainable by variation in a high pressure upon said resistors.

GUSTAV O. WILMS.